A. J. SAMS.
AUTOMATICALLY FACE LUBRICATED DRIVING BOX.
APPLICATION FILED SEPT. 15, 1916.

1,235,844.

Patented Aug. 7, 1917.

Witnesses

A. J. Sams
Inventor
by
Attorneys

UNITED STATES PATENT OFFICE.

ALBERT J. SAMS, OF FORT SCOTT, KANSAS.

AUTOMATICALLY FACE-LUBRICATED DRIVING-BOX.

1,235,844.  Specification of Letters Patent.  Patented Aug. 7, 1917.

Application filed September 15, 1916. Serial No. 120,369.

*To all whom it may concern:*

Be it known that I, ALBERT J. SAMS, a citizen of the United States, residing at Fort Scott, in the county of Bourbon and State of Kansas, have invented a new and useful Automatically Face-Lubricated Driving-Box, of which the following is a specification.

The present invention appertains to the driving boxes or bearings of locomotives, and it is the object of the invention to provide novel yet extremely simple and effective means in a driving box for automatically lubricating the adjacent faces of the box and driving wheel hub.

It is the object of the invention to provide means which can be readily incorporated in driving boxes now in use with little work and expense, whereby lubricant from the axle journal will be carried to the outer face of the driving box and the inner face of the wheel hub thereby automatically lubricating said faces during the rotation of the wheel and axle.

With the foregoing and other objects in view, which will be apparent as the nature of the invention is better understood, the invention resides in the provision in a driving box of means for carrying out the desired results, as will hereinafter more fully appear, it being understood that slight changes in details can be made within the scope of what is hereinafter claimed, without departing from the spirit of the invention.

The invention is illustrated in the accompanying drawing, wherein:—

Figure 1:
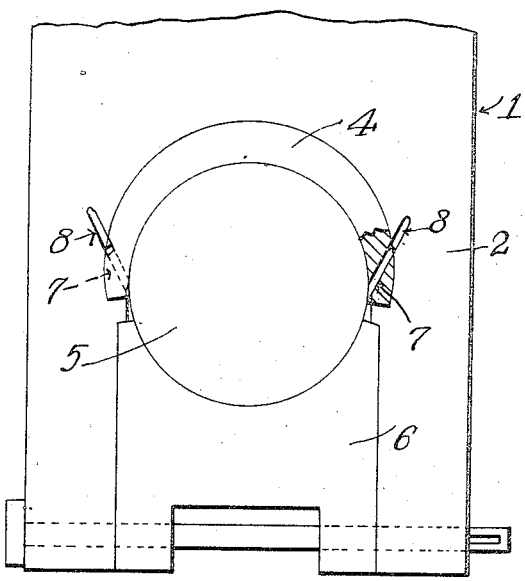

Figure 1 is a face view of a locomotive driving box.

Figure 2:
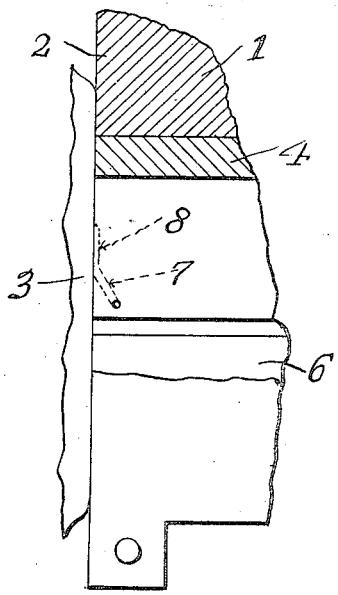

Fig. 2 is a fragmental side elevation thereof, portions being broken away and shown in section.

Figure 3:
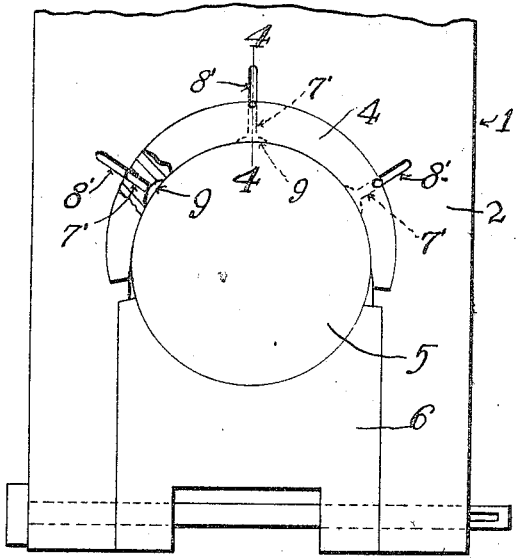

Fig. 3 is a fragmental face view of a driving box illustrating a modification.

Figure 4:
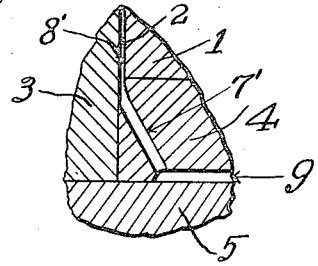

Fig. 4 is a section on the line 4—4 of Fig. 3.

In the drawing, a typical locomotive driving box is illustrated at 1, its outer face being designated 2. The wheel hub 3 has its inner face contacting with the face 2 of the driving box, and an arcuate "brass" or axle bearing 4 is fitted within the box 1 and seats snugly upon the axle journal 5 as usual. Disposed within the lower portion of the box 1 is the lubricant cellar block 6 for supplying lubricant to the axle journal which is carried between the contacting surfaces of the journal and bearing 4 which can be considered as a part of the box.

The invention resides in the provision of means for carrying the lubricant from the axle journal to the face 2 of the box 1 to lubricate the adjacent faces of the box and hub automatically and continually during the rotation of the wheel and axle.

In carrying out the invention, a bore or duct 7 is drilled in the bearing 4 of the box adjacent to each end thereof, at opposite sides of the journal and in reversed positions. Each bore 7 extends upwardly away from the axle journal upon substantially a chordal or tangential line from the journal, as seen in Fig. 1, the two bores extending in opposite directions relative to the periphery of the journal. The inner ends of the bores are located adjacent to the ends of the bearing 4 and are spaced inwardly from the face of the box 1 and its bearing 4, and said bores extend upwardly at an oblique angle from their inner ends to the face 2 of the box. The outer ends of the bores terminate at the outer face of the bearing 4 of the box adjacent to the division line between the bearing 4 and box proper. The box 1 and its bearing 4 are provided in their outer face with grooves 8 extending from the outer ends of the bores 7 at the same angle from the journal and forming continuations of said bores. The bore 7 as well as the grooves 8 diverge upwardly from the journal, and the grooves 8 grow shallower from those ends adjacent to the bores 7 to their remote ends, said remote ends merging or vanishing into the face 2 of the box beyond the bearing 4. The bore 7 can be readily drilled in the bearing 4, and the grooves 8 can be readily cut or gouged out with little work and expense being involved.

In operation, supposing that the journal 5 is rotating counter clockwise as seen in Fig. 1, so that the lubricant is carried in the same direction from the lubricant cellar to the contacting portions of the bearing and journal, some of the lubricant will be, by its upward movement, forced into the approximately tangential bore 7 at the right in Fig. 1, and the lubricant will thus be fed thr_ gu said bore to the respective groove 8 in the face 2 of the box. The flow of lubricant through the bore 7 from between the end of the bearing 4 and the axle journal to the contacting faces of the box and the hub is facilitated by the rotation of the hub past the groove 8 which is located in a chordal line relative to the hub and which extends in the same general direction in which the hub is rotating, so that the lubricant is carried from the groove 8 with the hub, the lubricant within the groove 8 being moved toward the outer end thereof away from the bore 7, thereby creating a suction tending to suck the lubricant from the journal. This assists the pressure of the lubricant from the journal into the bore 7 in supplying the lubricant to the face of the hub, from which the lubricant is spread throughout the contacting areas of the hub and box faces.

By the provision of the two opposite and reversely positioned bores 7 and grooves 8, one bore and its groove is effective when the wheel and axle rotate in either direction, to thereby provide for the continuous lubrication of the hub and box faces during the motion of the locomotive in either direction. The present invention although extremely simple, is nevertheless thoroughly practical and efficient, and provides for the constant and automatic lubrication of the hub and box faces.

In the modification illustrated in Figs. 3 and 4, the bearing 4 is provided upon its inner surface or that surface which contacts with the axle journal, with any suitable number of lubricant catching grooves or recesses 9 for catching the lubricant carried around with the journal, said grooves being preferably located longitudinally of the journal, although they can be arranged in any suitable manner. The bearing 4 is provided with bores or ducts 7' extending at an angle from the grooves 9 to the face of the box, and said face of the box is provided with the grooves 8' extending from the outer ends of the bores 7' to receive the lubricant from the bores and apply it to the face of the hub. The grooves or recesses 9 can be of various shapes for catching the lubricant, which in being pressed within said recesses will be forced into the bores 7' to the grooves 8' and faces of the box and the hub.

Having thus described the invention, what is claimed as new is:—

1. A driving box having a journal engaging bearing and a hub contacting face, the box being provided with a lubricant conducting duct extending from the journal engaging surface of the bearing to said face of the box.

2. A driving box having a journal engaging bearing and a hub contacting face, the box being provided with a lubricant conducting duct extending from the journal engaging surface of the bearing to said face of the box, the inner end of said duct being spaced from said face of the box and the duct extending angularly to said face.

3. A driving box having a journal engaging bearing and a hub contacting face, the box being provided with a lubricant conducting duct extending from the journal engaging surface of the bearing to said face of the box, the face of the box having a lubricant groove extending from the outer end of said duct.

4. A driving box having a journal engaging bearing and a hub contacting face, the box being provided with a lubricant conducting duct extending from the journal engaging surface of the bearing to said face of the box, the inner end of said duct being spaced from said face of the box and the duct extending angularly to said face, said face of the box having a lubricant groove extending from the outer end of said duct.

5. A driving box having a journal engaging bearing and a hub engaging face, said box being provided with a lubricant duct extending approximately tangentially from the journal engaging surface of said bearing to said face of the box.

6. A driving box having a journal engaging bearing and a hub engaging face, said box being provided with a lubricant duct extending approximately tangentially from the journal engaging surface of said bearing to said face of the box, the inner end of said duct being spaced from said face and said duct extending at an angle from its inner end to said face.

7. A driving box having a journal engaging bearing and a hub engaging face, said box being provided with a lubricant duct extending approximately tangentially from the journal engaging surface of said bearing to said face of the box, said face having a lubricant groove extending from the outer end of said duct in the same direction from said surface of the bearing.

8. A driving box having a journal engaging bearing and a hub engaging face, said box being provided with a lubricant duct extending approximately tangentially from the journal engaging surface of said bearing to said face of the box, the inner end of said duct being spaced from said face and said duct extending at an angle from its inner end to said face, said face having a lubricant groove extending from the outer end of said duct in the same direction from said surface of the bearing.

9. A driving box having an arcuate bearing to seat upon an axle journal and having a hub engaging face, said bearing being provided with upwardly diverging lubricant ducts adjacent to its ends extending from the journal engaging surface of said bearing to said face of the box.

10. A driving box having an arcuate bearing to seat upon an axle journal and having a hub engaging face, said bearing being provided with upwardly diverging lubricant ducts adjacent to its ends extending from the journal engaging surface of said bearing to said face of the box, the inner ends of said ducts being spaced from said face of the box and said face having upwardly diverging lubricant grooves extending from the outer ends of said ducts.

In testimony that I claim the foregoing as my own, I have hereto affixed my signature in the presence of two witnesses.

ALBERT J. SAMS.

Witnesses:
C. J. GALLAHER,
E. A. AYERS.